April 4, 1967  E. A. FERRIS ET AL  3,312,419
FASTENING MEANS FOR SEAT BELT RETRACTOR
Filed July 13, 1964
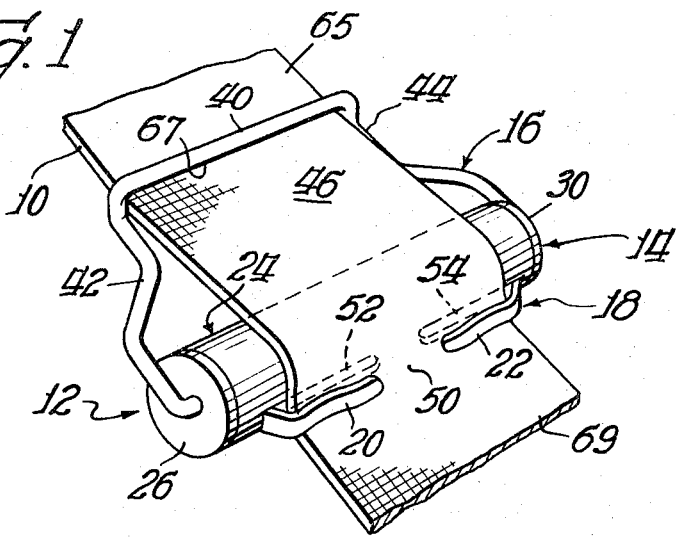
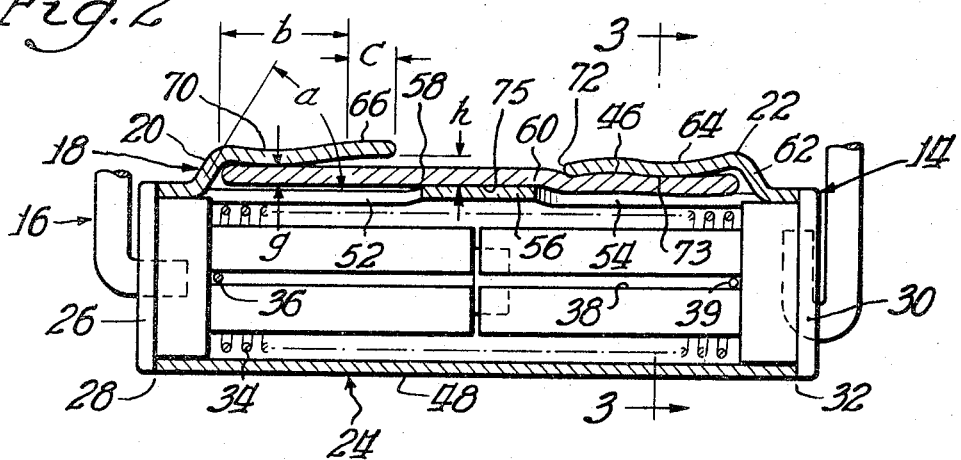
Inventors:
Ernest A. Ferris
and Stephen J. Zanoni
By: Richard J. Myers Atty.

United States Patent Office 3,312,419
Patented Apr. 4, 1967

3,312,419
FASTENING MEANS FOR SEAT BELT
RETRACTOR
Ernest A. Ferris, Elmhurst, and Stephen J. Zanoni, Glen Ellyn, Ill., assignors to Borg-Warner Corporation, Chicago, Ill., a corporation of Illinois
Filed July 13, 1964, Ser. No. 382,300
9 Claims. (Cl. 242—107.11)

This invention relates to improvements in seat belt retractors and in particular relates to fastening means for retaining a seat belt retractor on a seat belt.

Currently seat belts for use in vehicles such as passenger cars and airplanes, etc. are finding wide acceptance as a safety precaution for the occupant and passenger in the vehicle. In order to prevent a seat belt from becoming damaged such as to be caught in the door of a passenger car or other vehicle, a seat belt retractor is employed for maintaining the belt in a compact, out-of-the-way position. One type of retractor employed comprises a spring-wound reel of the belt roll-up type which allows the seat belt to be rolled in coils about the reel. Because of the stored energy of the spring-wound reel type of retractor, the retractor must be securely held to the reel.

It is therefore a general object of this invention to provide fastening means for holding a seat belt retractor fixed upon a seat belt in a firm holding relation.

Another object of this invention is to provide seat belt retractor fastening means in the form of a clamp structure mounted on a spring-loaded retractor reel of the roll-up type employing a reaction member engageable with the belt whereby the clamping structure acts to retain the reel firmly on the belt in opposition to the activity of the reaction member.

Still another object of this invention is to provide fastening means on the reel of a retractor unit of the roll-up type wherein the fastening means comprises a pair of axially extending arms of such configuration and design as to tightly grasp lateral portions of the belt and hold it in snug engagement with the outer periphery of the reel.

These and other objects will become apparent from reference to the following description and drawings, to wit:

FIGURE 1 is a perspective view of the invention mounted on a vehicle seat belt;

FIGURE 2 is an enlarged view of the invention, partly in section and illustrating the position of the fastening means before and after securing thereof to the retractor reel;

FIGURE 3 is a sectional view taken along line 3—3 of FIGURE 2; and

FIGURE 4 is an illustrative view for purposes of distinguishing the inventive configuration of the fastening means.

With reference now to the figures there is shown a portion of a vehicle safety seat belt upon which is mounted a retractor 12. The retractor comprises a reel 14 from which extends a reaction member 16 in the form of a bale or hinge element that is pivotally connected to the reel 14. Fastening means 18 in the form of a pair of tabs or arms 20 and 22 are mounted on the reel and secure the belt 10 to the reel 14.

The construction of the retractor 12 can be appreciated from reference to FIGURES 2 and 3 where it is seen that the reel 14 comprises a hollow tubular member or barrel 24. An anchor plug 26 extends in one end 28 of the barrel and is fixed to the barrel and a driver plug 30 extends in the other end 32 of the barrel and is rotatively journalled with respect to the barrel 24. The anchor plug 26 is partially disposed within the driver plug which is relatively rotatable with respect to the anchor plug. A spring 34 surrounds both plugs 26 and 30 and has a first end portion 36 mounted in the common channel 38 formed in and by the two plugs 26 and 32 and has another end 39 retained in the channel 38. The reaction member or hinge 16 comprises an axially extending part or cross arm 40 and a pair of side or radially extending arms 42 and 44, the cross arm 40 engaging the belt surface 46 of the belt 10, and the one side member 42 being rotatably journalled in the anchor plug 26 while the other arm 44 is fixedly connected in the driver plug 30 for a driving connection therewith. Thus, it will be seen that upon rotation of the reel 14 while holding the reaction member 16 fixed, the spring 34 may be tightly wound and that upon release of either the reaction member 16 or the reel 14, the reel element 14 will rotate relative to the reaction member 16.

Each arm or tab 20 or 22 of the fastening means is punched out or struck from the outer periphery 48. The arm 20 is located at the end 28 of the barrel and extends axially along the barrel and inwardly and the arm or tab 22 extends from the end 32 of the barrel axially along the barrel and inwardly toward the arm 20 and defines therewith an opening 50. The arm or clamp 20 has disposed directly beneath it in the barrel an aperture 52 formed as a result of the arm being punched from the barrel and the arm 22 has an aperture 54 beneath it which was similarly formed from the arm 22 being punched out of the barrel 24. The apertures or openings 52 and 54 have spaced between them the central peripheral portion 56 of the barrel which defines edges 58 and 60. Each tab 20 or 22 is identical to the other and comprises a base portion 62 anchored to the periphery 48 of the barrel 24, a central part 64 which is generally parallel to the periphery of the barrel, and an inner free end part 66 which is at a higher elevation or a greater radial distance outwardly from the barrel periphery than the other parts 62 and 64 of the tab or clamp arm 20 or 22. The radial projecting part 62 is formed at an angle "a" of less than 90 degrees. This angle is greater than 30 degrees and is preferably approximately 50 to 60 degrees. The central part 64 (generally indicated by "b," FIG. 2) has a slight belly or dip 70 toward the barrel periphery 48 and then proceeds to rise gradually at an outwardly inclined angle and merges with the inner free end part 66 (generally indicated by "c," FIG. 2) which is somewhat generally flat and parallel to the periphery 48 but which part 66 can taper ever so little at its very end 72 slightly radially inward toward the portions 58 or 60 of the barrel periphery. The part 66 is a greater distance "h" above the barrel periphery 48 than the dip portion 70 or part 64 and the incline of part 64, indicated as height "g."

The belt 10 is mounted on the retractor 12 by feeding a portion 65 of the belt through the reaction member 16 allowing the belt surface 46 to engage the underside 67 of the cross arm 40 while the other portion 69 of the belt is fed between the fastening means 18 and the barrel 24 whereby the belt surface 46 engages the undersurface 73 of the tabs 20 and 22 and the undersurface 75 of the belt contacts the periphery 48 of the barrel 24. By rotating the reel 14 relative to the reaction member 16, as aforedescribed prior to mounting the belt on the retractor, when the belt is positioned on the retractor it will be rolled into coiled layers about the reel for storing the belt in a small compact area where it cannot become damaged. When the belt is to be used about the waist of a vehicle passenger it, of course, can be extended against the action of the spring 34 tending to maintain the belt in a coiled position about the reel 14.

The tab or clamp arm 20 or 22, as described above, depicts its relation with respect to the barrel prior to being pinched by pliers or the like toward the barrel aperture 52 as illustrated by the left side clamp arm 20 shown in FIGURE 2. However, to perform a proper operative use the clamp arm 20 or 22 is compressed toward the aperture 52 or 54 of the barrel as illustrated by the right side clamp arm 22 in FIGURE 2. This pressing of the clamp arm forces the clamp arm into closer snug engagement with the belt surface 46 compressing the belt against the barrel periphery of the reel 14 and holding the belt between the portion 60 and tip 72 with portions of the belt snugly deposed in aperture 54. This forcing down of the clamp arm causes the end 66 of the clamp part not only to compress and grasp the belt 10 between the barrel portion 58 or 60 but allows the end part 66 to be extending somewhat parallel but slightly extended toward the barrel and also causes the part 64 to be in snug engagement with the belt 10 because of the swinging down of the parts 64 and 66 about the arm part 62. This allows the belly part or dip area 70 and the free end 72 of the part 66 to tightly contact the belt for double gripping of the belt in two places as well as to permit the tab undersurface 73 of parts 64 and 66 to be in more flush contact with the belt surface 46. This is so because of the configuration of the clamp arm as described and may be readily appreciated by referring to FIGURE 4 where there is shown another type of clamp arm 74, for illustrative purposes, which consists of a base part 76 and a flat part 78 which is merely bent by pinching as with pliers from the horizontal position as shown in dotted line, to the downwardly angled position permitting only the very end 78 of the clamp 74 to contact the belt and therefore there is only a relative point contact with the belt, whereas the invention provides a flush engagement of the clamp along a greater belt surface with less tendency for the belt to be turned by the single point contact of the inner end part of the clamp or arm. The inventive design therefore provides for a firmer grasping of the belt necessary because of the torque-loading or the reaction member 16 with respect to the reel 14, such torque-loading tending to swing the belt 10 about the clamp arms 20 and 22 to detach or dislodge the belt from the clamp arms 20 or 22. The inventive design by providing a firmer non-carrying grasp along a greater belt surface extent ensures proper and adequate tight grasping of the belt on the retractor. In aid of the grasping of the tab 20 or 22 it will be noted, as illustrated in FIGURE 3, that the top surface 80 of the tab 20 or 22 is concave along the axial extent thereof which gives a concavity to the belt gripped surface and forces it more readily into the aperture 52 for improved transverse gripping action on the belt.

Though the particular embodiment of the invention has been described and illustrated, it is apparent that modifications and alterations may be made thereon. It is therefore the intention in the appended claims to cover all subject modifications and alterations as may follow within the true spirit and scope of the invention.

What is claimed is:

1. In a vehicle safety belt retractor of the type having an elongated energized tubular reel having means carried by the periphery of the reel for attaching the belt to the periphery of the reel, said means including tabs struck from the periphery of the reel, each of said tabs including a first base portion extending generally radially from the periphery of the reel adjacent one terminal of the said reel, said first portion being inclined toward the remote terminal of said reel and the other tab at an acute angle to the axis of the reel, a second portion generally parallel with the periphery of the reel merging with the terminal of the first portion and a third axially inwardly located terminal portion merging with said second portion and extending radially outward of said first portion, said tab being effective to receive one side of a safety belt between the inner surface of the tab and the periphery of said reel such that when said tab is moved radially inwardly to clamp said belt to the periphery of said reel said angle is reduced and said second and third portions are moved into a position closer to the general axis of said reel whereby the said inner surface of said tab engages said belt substantially uniformly throughout said inner surface of said tab.

2. In a vehicle safety belt retractor of the type having an elongated energized tubular reel having means carried by the periphery of the reel for attaching the belt to the periphery of the reel, said means including tabs struck from the periphery of the reel, each of said tabs including a first base portion extending generally radially from the periphery of the reel adjacent one terminal of the said reel, said first portion being inclined toward the other terminal of said reel and the other tab at an angle to the periphery of the reel of less than ninety degrees but greater than thirty degrees, a second outwardly inclining but generally horizontal portion merging with the terminal of said first portion, and a third axially inwardly located generally parallel free terminal portion merging with said second portion and being radially outward of the first portion, each tab being effective to receive a side of a safety belt between the inner surface of the tab and the periphery of said reel, such that when said tab is moved radially inwardly to clamp said belt to the periphery of said reel said angle is reduced and said second and third portions are moved into a position closer to the general axis of said reel whereby the said inner surface of said tab engages said belt substantially uniformly throughout said inner surface of said tab.

3. In a vehicle safety belt retractor of the type having an elongated energized tubular reel having means carried by the periphery of the reel for attaching the belt to the periphery of the reel, said means including fastening belt tabs mounted axially on the periphery of the reel, each of said tabs including a first portion extending generally radially from the periphery of the reel adjacent one terminal of the reel, said first portion being inclined toward the other terminal of the reel and toward the other tab at an acute angle to the periphery of the reel, a second moderately V-shaped portion generally parallel with the periphery of the reel and connected with the first portion, and a third axially inwardly located terminal portion generally parallel with the periphery and connected with the second portion and extending radially outward of said first portion, each of said tabs being effective to receive a side of a safety belt between the inner surface of the respective tab and the periphery of said reel such that when said tab is moved radially inward to clamp the belt to the periphery of said reel said angle is reduced and said second and third portions are moved into a position closer to the general axis of said reel whereby the inner surface of each tab engages the belt effectively uniformly throughout said inner surface of the respective tab.

4. In a vehicle safety belt roll-up retractor device adapted to be connected to and carried on a belt having a flat surface of substantial width relative to the thickness thereof, said retractor being of the type including a spring driven hollow tubular reel having means at the periphery thereof for fastening the reel to the safety belt, said fastening means being formed with a belt engaging surface extending transversely of the belt and spaced a distance from the periphery of said reel not substantially greater than the thickness of the belt, said fastening means being in the form of tabs struck from the wall of said tubular reel from positions adjacent the terminals of said reel extending coaxially inwardly to a position where the inner terminals of said tabs are in spaced juxtaposed relation providing for the ready insertion of the belt from the side thereof, said tabs each being particularly characterized by having a generally diagonally outwardly extending base portion adjacent the terminal of said reel and merging with said reel, a second portion extending generally parallel with the axis of the reel and an inner terminal portion extending outwardly of the first portion whereby when the belt is installed, said second and inner portions may be pressed radially inwardly into contact with said belt for holding the same firmly through a substantial portion of the length of said tab.

5. In a vehicle safety belt retractor of the type having an elongated energized hollow tubular reel including axially inwardly extending tabs struck from the periphery of the reel surface, each of said tabs including a first tab portion extending generally radially from the periphery of the reel at a position closely adjacent but spaced axially inwardly from the terminal of said reel, said first tab portion being inclined toward the remote terminal of said reel at an acute angle to the axis of the reel, said angle having a value less than ninety degrees but greater than thirty degrees, a second tab portion merging with the radially outwardly extending terminal portion of said first tab portion and extending generally parallel to the axis of said tubular reel, and a third axially inwardly located tab portion radially outward of the first tab portion and merging with said second tab portion, each of said tabs being adapted to receive one side of a safety belt between the inner surface thereof and the periphery of said reel, said arrangement being particularly characterized by having a mode of coaction such that when said second and said third tab portions are moved radially inwardly into closer engagement with said belt, the same are effective to clamp said belt to the periphery of said reel, said angle of said first base portion of said tab being reduced and the inner surface of said second and third tab portions thus engaging said belt substantially uniformly throughout the inner surface thereof.

6. In a vehicle safety belt retractor of the type having an energized tubular reel having means carried by the periphery of the reel for attaching the belt to the periphery of the reel, said means including a pair of tabs mounted on the outer periphery of the reel, each tab being spaced at an opposed end of the reel and directed toward one another and defining a belt receiving space between one another, each tab having a radially outwardly extending anchor portion connected with the reel and at an acute angle with the periphery of the reel and a second portion being inclined toward the periphery of the reel and extending away from the periphery of the reel a greater extent than the first portion, said periphery of the reel having a pair of apertures formed therein, each aperture being below a respective tab and defining a belt engaging edge such that when a respective tab is moved radially inward to clamp the belt to the periphery of the reel the angle is reduced and said second portion is moved into a position closer to the general axis of the reel whereby the inner surface of the tab snugly engages the belt substantially uniformly throughout the inner surface of the second portion, pressing the belt into the respective aperture and pinching the belt tightly between the edge of the aperture and the inner surface of the second portion of the tab.

7. In a vehicle safety belt retractor of the type having an energized tubular reel having means carried by the periphery of the reel for attaching the belt to the periphery of the reel, said means including a pair of tabs mounted on the outer periphery of the reel, each tab being spaced at an opposed end of the reel and directed toward one another and defining a belt receiving space between one another, each tab having a radially outwardly extending anchor portion connected with the reel and a second portion being inclined toward the periphery of the reel and extending away from the periphery of the reel a greater extent than the first portion, said periphery of the reel having a pair of apertures formed therein, each aperture being below a respective tab and defining a belt engaging edge such that when a respective tab is moved radially inward to clamp the belt to the periphery of the reel said second portion is moved into a position closer to the general axis of the reel whereby the inner surface of the tab snugly engages the belt substantially uniformly throughout the inner surface of the second portion, pressing the belt into the respective aperture and pinching the belt tightly between the edge of the aperture and the inner surface of the second portion of the tab.

8. In a vehicle safety belt retractor of the type having an energized tubular reel having means carried by the periphery of the reel for attaching the belt to the periphery of the reel, said means including a pair of tabs mounted on the outer periphery of the reel, each tab being spaced at an opposed end of the reel and directed toward one another and defining a belt receiving space between one another, each tab having a radially outwardly extending anchor portion connected with the reel and a second portion being inclined toward the periphery of the reel and extending away from the periphery of the reel a greater extent than the first portion, such that when a respective tab is moved radially inward to clamp the belt to the periphery of the reel, said second portion is moved into a position closer to the general axis of the reel whereby the inner surface of the tab snugly engages the belt substantially uniformly throughout the inner surface of the second portion, pressing and pinching the belt tightly between the reel periphery and the inner surface of the second portion of the tab.

9. In a vehicle safety belt retractor of the type having an energized tubular reel having means carried by the periphery of the reel for attaching the belt to the periphery of the reel, said means including a pair of tabs struck from and extending outwardly of and forming an aperture in the periphery below each tab on the outer periphery of the reel, each tab being spaced at an opposed end of the reel and directed toward one another and defining a belt receiving space between one another, each tab having a radially outwardly extending anchor portion connected with the reel and a second portion being inclined toward the periphery of the reel and extending away from the periphery a greater extent than the first portion, the periphery of the reel at each aperture defining a belt engaging edge such that when a respective tab is moved radially inward to clamp the belt to the periphery of the reel said second portion is moved into a position closer to the general axis of the reel whereby the inner surface of the tab snugly engages the belt substantially uniformly throughout the inner surface of the second portion, pressing the belt into the respective aperture and pinching the belt tightly between the edge of the aperture and the inner surface of the second portion of the tab.

References Cited by the Examiner
UNITED STATES PATENTS 1,534,755   4/1925   Abbott _____ 242—74
3,223,236   12/1965  Troendly _____ 242—107.11 X STANLEY N. GILREATH, *Primary Examiner.*

W. S. BURDEN, *Assistant Examiner.*